(12) United States Patent
Abe

(10) Patent No.: US 9,235,558 B2
(45) Date of Patent: Jan. 12, 2016

(54) INFORMATION PROCESSING DEVICE, PROCESSING METHOD, PROGRAM, AND RECORDING MEDIUM

(71) Applicant: Yurina Abe, Shinagawa-ku (JP)

(72) Inventor: Yurina Abe, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/361,952

(22) PCT Filed: Mar. 5, 2013

(86) PCT No.: PCT/JP2013/055974
§ 371 (c)(1),
(2) Date: May 30, 2014

(87) PCT Pub. No.: WO2013/161393
PCT Pub. Date: Oct. 31, 2013

(65) Prior Publication Data
US 2014/0317484 A1     Oct. 23, 2014

(30) Foreign Application Priority Data

Apr. 27, 2012  (JP) .................................. 2012-104214

(51) Int. Cl.
  *G06F 17/00* (2006.01)
  *G06F 17/21* (2006.01)
  *G06F 17/22* (2006.01)
(52) U.S. Cl.
  CPC .......... *G06F 17/2235* (2013.01); *G06F 17/211* (2013.01)
(58) Field of Classification Search
  CPC .......... G06F 17/2211; G06F 17/30253; G06F 17/30696; G06F 17/30873
  See application file for complete search history.

(56) References Cited

U.S. PATENT DOCUMENTS

| | | | |
|---|---|---|---|
| 7,587,309 B1* | 9/2009 | Rohrs et al. ................... | 715/236 |
| 2005/0065806 A1* | 3/2005 | Harik ..................... | G06Q 30/02 705/1.1 |
| 2006/0069670 A1* | 3/2006 | Khaliq et al. .................... | 707/3 |
| 2007/0239662 A1* | 10/2007 | Fontes et al. ...................... | 707/2 |
| 2011/0314372 A1* | 12/2011 | Teevan et al. ................. | 715/255 |

FOREIGN PATENT DOCUMENTS

| | | | |
|---|---|---|---|
| JP | 2001-52032 A | 2/2001 | |
| JP | 2002-99557 A | 4/2002 | |
| JP | 2004-334382 A | 11/2004 | |
| JP | 2006-220710 A | 8/2006 | |

OTHER PUBLICATIONS

International Search Report of PCT/JP2013/055974, dated May 7, 2013.

* cited by examiner

*Primary Examiner* — Kavita Padmanabhan
*Assistant Examiner* — Ariel Mercado
(74) *Attorney, Agent, or Firm* — Sughrue Mion, PLLC

(57) ABSTRACT

This information processing device (100) is provided with an excerpter (101) and a corrector (103). The excerpter (101), on a screen upon which an original document is displayed, acquires an excerpted document by excerpting characters to be displayed relatively larger from the original document. The corrector (103), if an excerpted document amount to be displayed upon the screen does not fit within a predetermined amount, corrects a criterion for relative size by which the excerpter (101) excerpts characters. In addition, the excerpter (101), on the basis of the corrected criterion, obtains the excerpted document.

15 Claims, 17 Drawing Sheets

500

INFORMATION PROCESSING DEVICE, PROCESSING METHOD, PROGRAM, AND RECORDING MEDIUM

CROSS REFERENCE TO RELATED APPLICATIONS

This application is a National Stage of International Application No. PCT/JP2013/055974 filed Mar. 5, 2013, claiming priority based on Japanese Patent Application No. 2012-104214, filed Apr. 27, 2012, the contents of all of which are incorporated herein by reference in their entirety.

TECHNICAL FIELD

The present invention relates to an information processing device, processing method, program and recording medium, and more particularly to excerption of contents of a document.

BACKGROUND ART

Technology is known for generating excerpts based on font size for each page of contents having plural page format (electronic book) (for example, refer to Patent Literature 1). In this case, the number of characters that are included on one page is limited, so that a character string to be excerpted is also limited.

CITATION LIST

Patent Literature

Unexamined Japanese Patent Application Kokai Publication No. 2006-220710

SUMMARY OF INVENTION

Technical Problem

Generally, there are no limits to the document content amount, so that variations in document length occur. When the length of documents varies in this way, an excerpted document amount also varies such as when the contents to be excerpted are taken to be a certain font size or greater. When the excerpted document amount was great, there was a problem in that the clarity was bad.

The objective of the present invention is to solve such a problem by providing an information processing device, processing method, program and recording medium for acquiring an excerpted document for which fluctuation does not easily occur due to the document content amount.

Solution to Problem

The information processing device according to a first aspect of the present invention comprises:
an excerpter that obtains an excerpted document by excerpting characters from an original document that are to be displayed at a relatively large size on a screen on which the original document is displayed; and
a corrector that corrects a criterion of the relative size of characters to be excerpted by the excerpter when an excerpted document amount that is to be displayed on the screen does not fit inside a specified amount; wherein
the excerpter obtains the excerpted document based on the corrected criterion.

The information processing device according to the aspect above, wherein
the excerpter excerpts the characters from the original document based on a reference character size that is the criterion for excerpting the characters; and
the corrector corrects the reference character size to a larger size when the amount does not fit inside the specified amount, and corrects the reference character size to a smaller size when the amount fits into the specified amount so that blank spaces in the specified amount where the excerpted document is arranged become small.

The information processing device according to the aspect above, wherein
the corrector corrects the reference character size to a smaller size when the characters excerpted from the original document are displayed further toward the start of the original document than a specified element, and corrects the reference character size to a larger size when the characters excerpted from the original document are displayed further toward the end of the original document than the specified element.

The information processing device according to the aspect above, wherein
the corrector acquires the size of a display area where the original document is displayed on the screen, and finds the size of the specified amount from the acquired size.

The information processing device according to the aspect above further comprises
a calculator that calculates the amount.

The information processing device according to the aspect above, wherein
the excerpter obtains the excerpted document by excerpting the characters while maintaining the character size of the original document that is displayed on the screen.

The information processing device according to the aspect above, wherein
the corrector corrects the criterion based on whether or not decorating is performed on characters that are the target of excerption.

The information processing device according to the aspect above, wherein
the decorating is at least a setting of foreground color, background color, framing, or character style in the original document.

The information processing device according to the aspect above, wherein
the original document is a webpage; and
the excerpter excludes an image or characters to which a URL having a domain that is different than the webpage is linked, from a target of excerption.

The information processing device according to the aspect above, wherein
the excerpter performs character recognition of characters and character size from images that are included in the original document, and takes the recognized characters to be the target of excerption.

The information processing device according to the aspect above, wherein
the original document is a webpage that introduces products; and
the corrector acquires the genre of the products, and based on the acquired genre, corrects the criterion so that the recognized characters are preferentially excerpted.

The information processing device according to the aspect above, wherein
the original document is a document that is linked to the document that is currently displayed on the screen, and the excerpter obtains the excerpted document on an assumption that the original document is displayed on the screen.

The information processing device according to the aspect above, wherein the excerpter does not include characters that are included in the document that is currently displayed on the screen in the excerpted document.

A processing method according to a second aspect of the present invention comprises:

an excerption step for obtaining an excerpted document by excerpting characters from an original document that are to be displayed at a relatively large size on a screen on which the original document is displayed; and a correction step for correcting a criterion of the relative size of characters to be excerpted by the excerpter when an excerpted document amount that is to be displayed on the screen does not fit inside a specified amount; wherein in the excerption step, the excerpted document is obtained based on the corrected criterion.

A program according to a third aspect of the present invention that causes a computer to function as:

an excerpter that obtains an excerpted document by excerpting characters from an original document that are to be displayed at a relatively large size on a screen on which the original document is displayed; and a corrector that corrects a criterion of the relative size of characters to be excerpted by the excerpter when an excerpted document amount that is to be displayed on the screen does not fit inside a specified amount; wherein the excerpter obtains the excerpted document based on the corrected criterion.

A recording medium according to a fourth aspect of the present invention that is readable by a computer and on which a program is recorded that causes a computer to function as:

an excerpter that obtains an excerpted document by excerpting characters from an original document that are to be displayed at a relatively large size on a screen on which the original document is displayed; and a corrector that corrects a criterion of the relative size of characters to be excerpted by the excerpter when an excerpted document amount that is to be displayed on the screen does not fit inside a specified amount; wherein the excerpter obtains the excerpted document based on the corrected criterion.

The recording medium above can be a non-transitory recording medium, and can be distributed or sold independently from the computer. Here, a non-transitory recording medium is called a tangible recording medium. The non-transitory recording medium is, for example, a compact disk, a flexible disk, a hard disk, an electromagnetic disk, a digital video disk, magnet tape, semiconductor memory and the like. A transitory recording medium indicates a transmission medium (propagation signal) itself. A transitory recording medium is, for example, an electrical signal, optical signal, electromagnetic waves, and the like. A temporary memory area is an area for temporarily storing data and programs, and is, for example, a volatile memory such as a RAM (Random Access Memory).

Advantageous Effects of Invention

With the present invention it is possible to provided an information processing device, processing method, program and recording medium that are suitable for acquiring an excerpted document for which variation does not occur easily due to the document content amount.

DESCRIPTION OF EMBODIMENTS

In the following, embodiments of the present invention will be explained. The embodiments are for explanation only, and do not limit the range of the present invention. Therefore, embodiments in which some elements or all elements of these embodiments are replaced with equivalent elements by one skilled in the art can also be employed, and such embodiments are also included within the range of the present invention.

Figure 1:
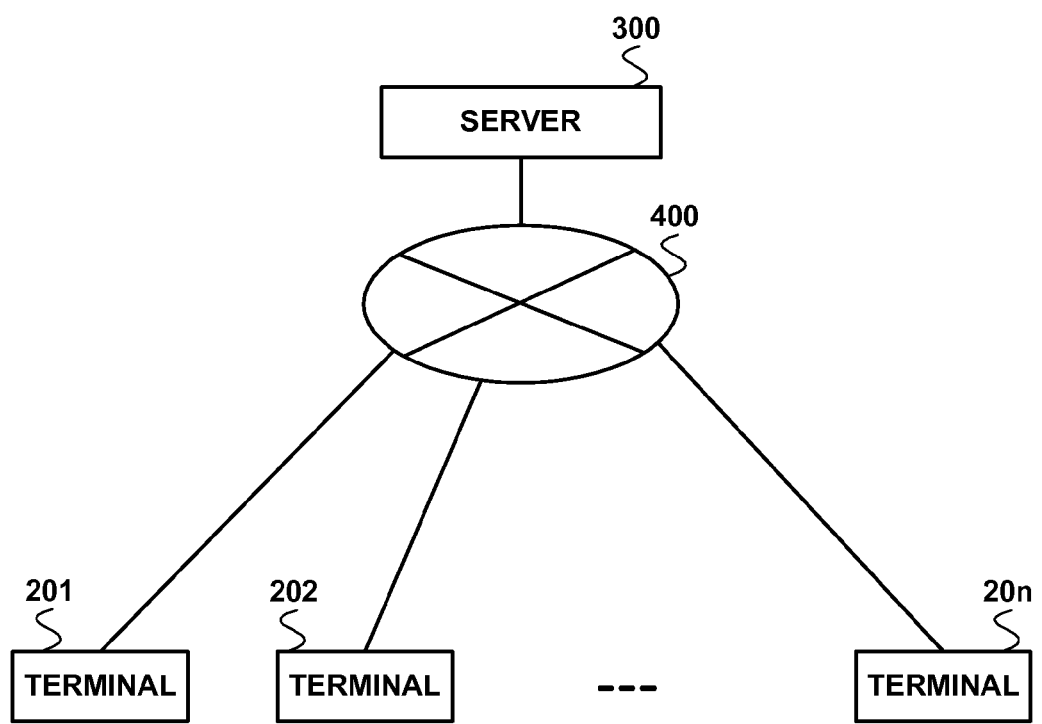
FIG. 1 is a drawing that illustrates the relationship between a server and terminals.

FIG. 1 illustrates a state in which plural terminals 201, 202 to 20*n* (hereafter, collectively referred to as "terminal 200") that are operated by users are connected to a server 300 by way of the Internet 400. An information processing device 100 of embodiments of the present invention, for example, provides an excerpt of a document that is displayed by a terminal 200. In this case, the information processing device 100 can be achieved by the terminal 200 or the server 300 or both.

In the following, construction of a typical information processing device 500 that is achieved by the information processing device 100 of embodiments of the present invention will be explained.

(1. Construction of a Typical Information Processing Device)

Figure 2:
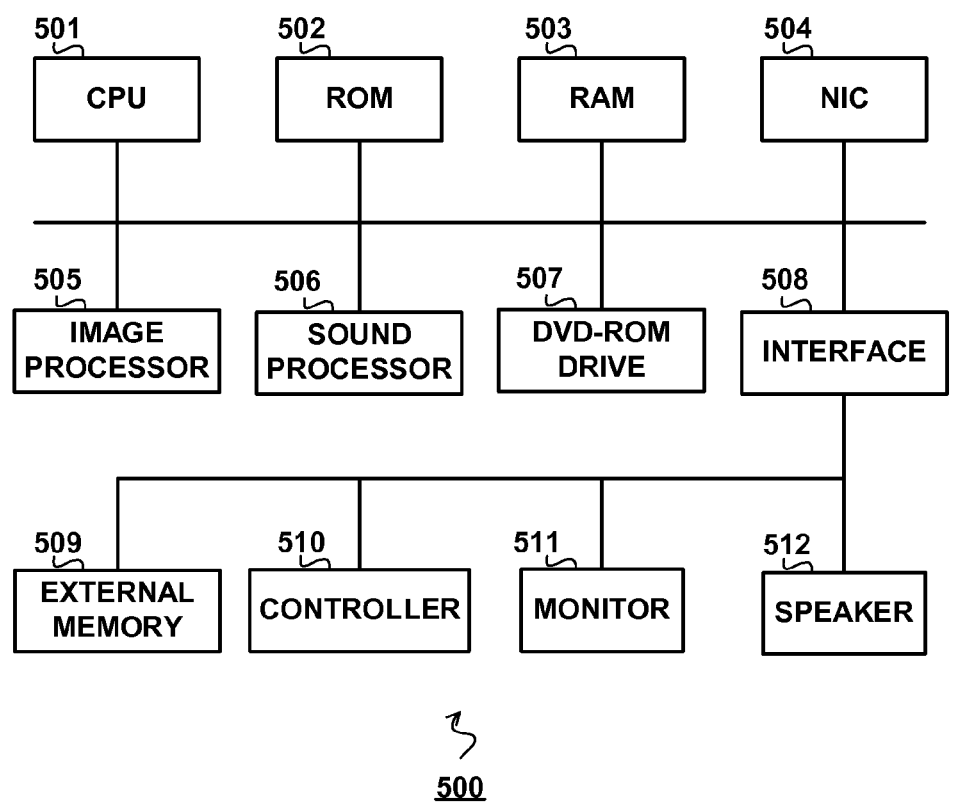
FIG. 2 is a drawing that illustrates the construction of a typical information processing device that is achieved by the information processing device of embodiments of the present invention.

As illustrated in FIG. 2, the information processing device 500 comprises a CPU (Central Processing Unit) 501, a ROM (Read only Memory) 502, a RAM (Random Access Memory) 503, an NIC (Network Interface Card) 504, an image processor 505, an audio processor 506, a DVD-ROM (Digital Versatile Disc ROM) drive 507, an interface 508, an external memory 509, a controller 510, a monitor 511 and a speaker 512.

CPU 501 performs overall control of the operations of the information processing device 500, is connected with all of the components and exchanges control signals and data with those components.

An IPL (Initial Program Loader) that is executed immediately after the power has been turned ON is stored in the ROM 502, and by executing this IPL, a specified program is read to the RAM 503, and the CPU 501 begins to execute that program. The operating system program and various kinds of data that are necessary for overall control of the information processing device 500 are stored in the ROM 502.

The RAM 503 is for temporarily storing data and programs, and stores programs and data read from a DVD-ROM, or other data and the like necessary for communication.

The NIC 504 is for connecting the information processing device 500 to a computer communication network such as the Internet, and comprises an interface (not illustrated in the figure) that functions as an intermediary between the CPU 501 and a device that complies to the 10BASE-T/100BASE-T standard that is used when building an LAN (Local Area Network), an analog modem, an ISDN (Integrated Services Digital Network) modem, and ADSL (Asymmetric Digital Subscriber Line) modem for connecting to the Internet using telephone lines, a cable mode for connecting to the Internet using cable television lines, and the like.

After data that is read from a DVD-ROM or the like is processed by the CPU 501 or an image processor (not illustrated in the figure) of the image processor 505, the image processor 505 stores the processed data in a frame memory (not illustrated in the figure) of the image processor 505. The image information that is stored in the frame memory is converted to a video signal at specified synchronization timing, and outputted to the monitor 511. As a result, various page displays become possible.

The audio processor 506 converts audio data that is read from a DVD-ROM or the like to an analog audio signal, and causes audio to be outputted from the speaker 512 that is connected to the audio processor 506. Moreover, under the control of the CPU 501, the audio processor 506 creates sounds that are to be generated during the processing by the information processing device 500, and causes corresponding audio to be output from the speaker 512.

A program for making it possible to achieve the information processing device 100 of the embodiments of the invention, for example, is stored on a DVD-ROM that is mounted in the DVD-ROM drive 507. Under control of the CPU 501, the DVD-ROM drive 507 performs a reading process for reading the DVD-ROM that is mounted in the drive, and reads the necessary program and data; the program and data are then temporarily stored in the RAM 503.

The external memory 509, controller 510, monitor 511 and speaker 512 are connected to the interface 508 so as to be removable.

Data related to personal information about the user is stored in the external memory 509 so as to be rewritable.

The controller 510 receives operation input that is performed when performing various settings of the information processing device 500. The user of the information processing device 500 is able to appropriately store such setting data in the external memory 509 by inputting an instruction by way of the controller 510.

The monitor 511 provides the user of the information processing device 500 with data that was outputted by the image processor 505.

The speaker 512 provides the user of the information processing device 500 with audio data that was outputted by the audio processor 506.

In addition to this, the information processing device 500 can use a large capacity external storage device such as a hard disk to perform the same functions as the ROM 502, RAM 503, external memory 509, DVD-ROM that is mounted in the DVD-ROM drive 507, and the like.

In the following, the construction of the information processing device 100 of the present invention that is achieved by the information processing device 500 described above, will be explained with reference to FIG. 1 to FIG. 17. By turning ON the power to the information processing device 100, a program that causes the information processing device 500 to function as the information processing device 100 of the embodiments is executed, and the information processing device 100 of the embodiments is achieved.

(2. Construction of the Information Processing Device of a First Embodiment)

The information processing device 100 of a first embodiment excerpts characters from an original document that are being displayed at a relatively large size.

Figure 3:
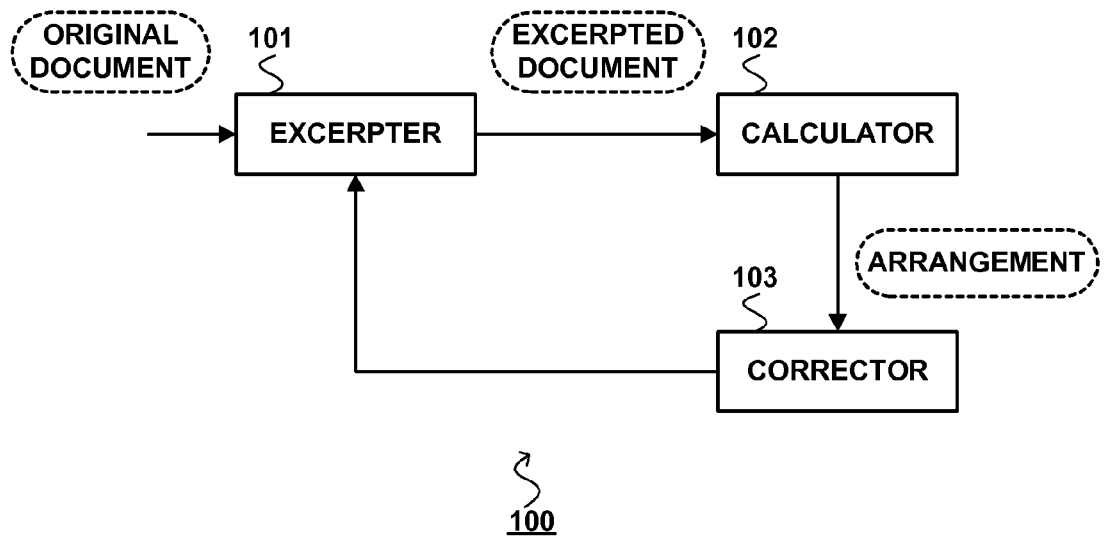
FIG. 3 is a drawing that illustrates the construction of an information processing device of a first embodiment.

The information processing device 100 of this embodiment, as illustrated in FIG. 3, comprises an excerpter 101, a calculator 102 and a corrector 103.

The excerpter 101 acquires an excerpted document by excerpting characters from an original document that are to be displayed at a relatively large size on a screen which the original document is displayed.

The original document is an electronic document that includes text and/or images. For example, the original document is a document that is entered using a markup language. In the following example, the original document is a document that is in HTML (Hyper Text Markup Language).

The excerpted document is a document that comprises part of the contents of the original document, and finally is a document that is displayed on the screen at the same time as the original document. The user, by viewing this excerpted document, can roughly know what kind of content is included in the original document.

Figure 4:
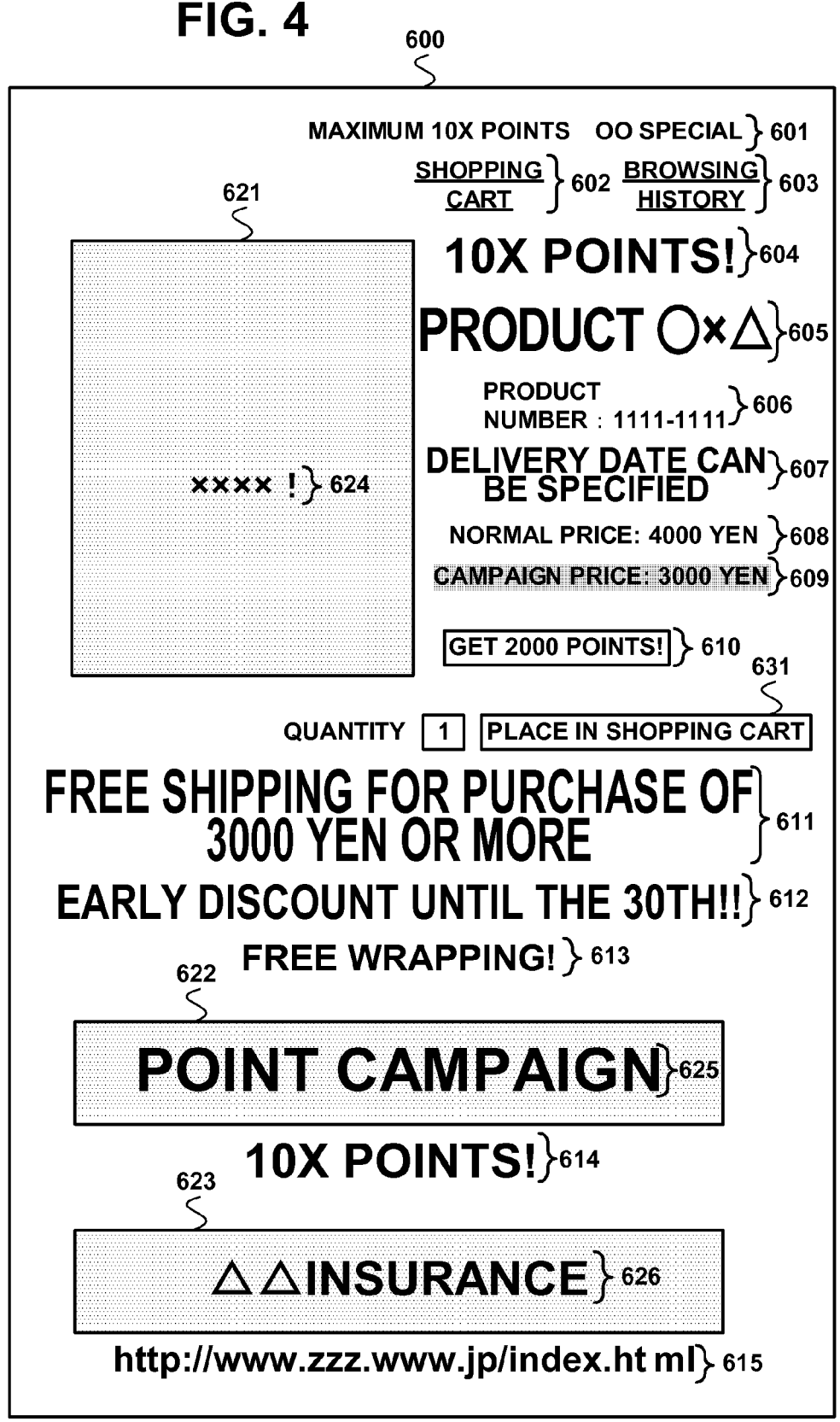
FIG. 4 is a drawing for explaining an original document.
Figure 5:
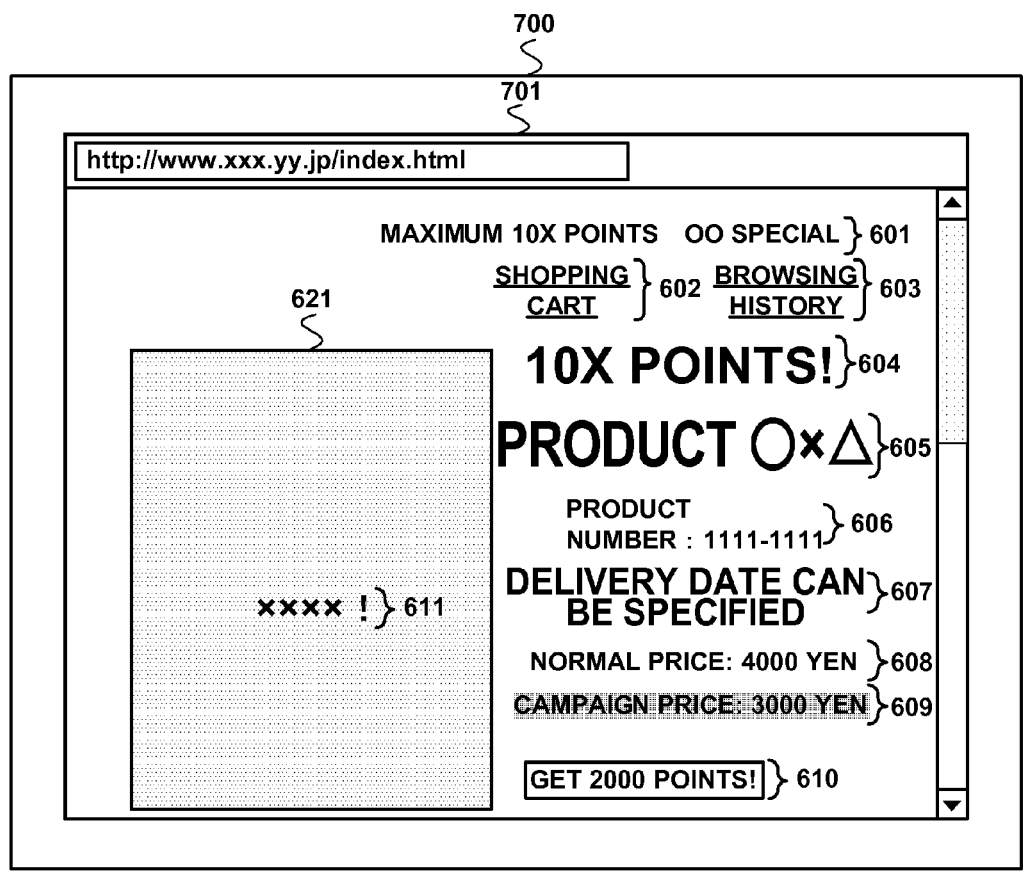
FIG. 5 is a drawing for explaining the original document that is displayed on a screen.

An example of an original document is illustrated in FIG. 4. Included in the original document 600 are character strings 601 to 615, images 621 to 623, and a button 631. In the original document 600 there are four kinds of character sizes (from largest to the smallest there is "very large", "large", "medium" and "small"). The character strings having a very large character size are character strings 605 and 611; the character strings having a large character size are character strings 604, 612 and 614; the character strings having a medium character size are character strings 607, 613 and 615, and the character strings having a small character size are the remaining character strings 601 to 603, 606 and 608 to 610. The original document 600, as illustrated in FIG. 5, is such that part is displayed by a browser 701 that is displayed on a screen 700. The user can view the bottom part of the original document 600 by scrolling the display.

The character strings 601 to 615 are character strings that are separated from each other by a new line or a tag. In this embodiment, the unit of characters to be excerpted is a character string that is separated from each other by a new line or a tag.

The excerpter 101 excerpts relatively large characters from the original document 600. Relatively large characters in the original document 600 are characters in characters strings having a character size that is larger than that of the smallest character strings 601 to 603, 606 and 608 to 610, or in other words, character strings having a very large, large or medium character size.

Here, the excerpter 101 acquires an excerpted document by excerpting character strings while maintaining the character size at the same size of that in the original document that is displayed on the screen.

In other words, when obtaining an excerpted document, the excerpter 101 acquires size information about the character sizes of the character strings 604, 605, 607 and 611 to 615 that are to be excerpted. This character size information can be a value that indicates the absolute size on the screen 700, or can be a value that indicates the relative size between characters.

The excerpter 101 also does not excerpt the same characters when certain characters have been included more than once in the excerpted document.

For example, the characters of character string 604 and character string 614 are the same, so the excerpter 101 includes the characters only once in the excerpted document. Therefore, the excerpted document that the excerpter 101 obtains includes character strings 604 (or character string 614), 605, 607, 611 to 613 and 615.

In this embodiment, the CPU 501 functions as the excerpter 101. The same is true in the other embodiments below.

The calculator 102 calculates the excerpted document amount that is to be displayed on the screen.

The amount to be displayed is the arrangement (layout) or number of characters, for example. The calculator 102 serves the role of a rendering engine that calculates the arrangement that is displayed on the screen according to, for example, the format that is specified for the excerpted document or a style sheet that is prepared in advance. For example, the calculator 102 has an HTML rendering engine function and calculates the arrangement based on information about the excerpted character string and character size, and based on CSS (Cascading Style Sheets) that are prepared in advance.

In this embodiment, the CPU 501 functions as the calculator 102. The same is true in the embodiments below.

The corrector 103 corrects the criterions for excerpting characters by the excerpter 101 when the amount of the excerpted document amount does not fit into a specified amount.

Figure 6:
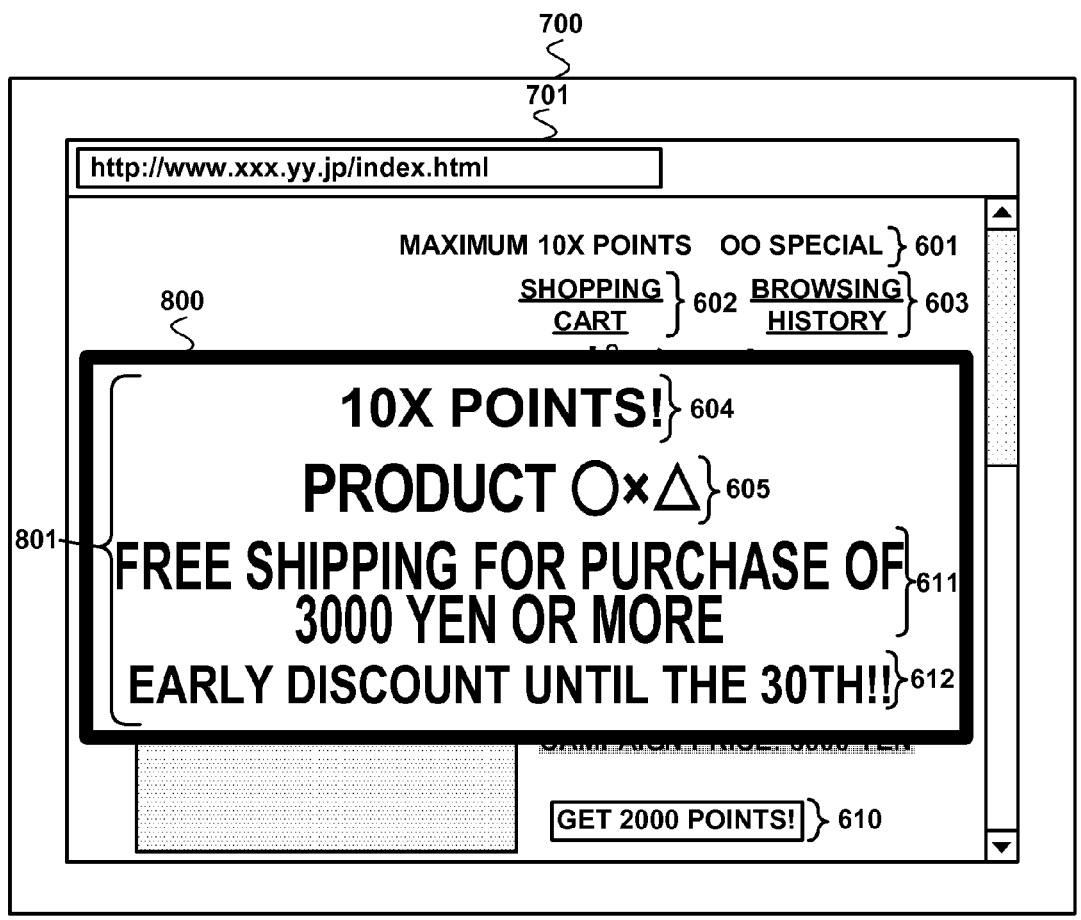
FIG. 6 is a drawing for explaining an excerpted document.

The specified amount represents an area on the screen in which the excerpted document is to be displayed. For example, the area 800 in FIG. 6 represents the specified amount. Hereafter, this will be called the specified area.

Here, the corrector 103 acquires the size of the display area on the screen in which the original document is displayed, and finds the specified area (specified amount) from that acquired size.

The size of the specified area can be any size as long as the user can view the entire excerpted document on the screen 700 at one time.

For example, the corrector 103 acquires the size of the display area of the browser 701 that is displayed on the screen 700. The display area of the browser 701 is the area that does not include the address bar or scroll portion. The corrector 103 takes an area that is less than the size of acquired display area as the specified area. Hereafter, the size of the specified area is taken to be the size in which area 800 is displayed.

For example, when the excerpted document includes character strings 604, 605, 607, 611 to 613 and 615, that excerpted document does not fit inside the area 800. Therefore, the corrector 103 corrects the criterion for excerpting characters from the original document 600 by the excerpter 101. For example, the corrector 103 corrects the criterion so that the size of the characters to be excerpted is one size larger so that the excerpted document will fit in the specified area.

At the current level, the excerpter 101 employs a criterion of excerpting characters having a size that is larger than the minimum size (small size). Therefore, the corrector 103 corrects the criterion so that excerpter 101 excerpts characters having a size one size larger, or in other words, a size larger than the medium size.

After the criterion has been corrected, the excerpter 101 excerpts characters based on that criterion, and obtains a new excerpted document. In other words, the excerpter 101 obtains an excerpted document 801 that includes character strings 605 and 611 having a very large character size, and character strings 604 and 612 having a larger character size.

The calculator 102 then calculates the arrangement of the new excerpted document 801, and the corrector 103 determines whether or not that arrangement will fit inside the area 800. As illustrated in FIG. 6, the excerpted document 801 that includes character strings 604, 605, 611 and 612 fits inside the area 800. In this case, the corrector 103 does not correct the excerpt criterion, and the excerpted document 801 that was obtained is displayed on the screen 700.

In this embodiment, the CPU 501 functions as the corrector 103. The same is true in the embodiments below.

With this embodiment, it is possible to obtain an excerpted document in which fluctuation in the display size does not easily occur due to the document content amount. Moreover, the display size for displaying the excerpted document is found based on the size of the display area, so the excerpted document can always fit inside the screen. As a result, it is possible to check the excerpted contents at a glance without having to perform a screen operation such as scrolling. Furthermore, by obtaining the excerpted document with the character size of the document maintained as is, it is possible to know which characters area emphasized. Characters in the document that are displayed having a large size are thought to be important information in that document, so that by excepting characters that are to be displayed at a relatively large size, it is possible to prioritize the excerption of important information.

The excerpter 101 can also recognize characters and character sizes from images that are included in the original document, and take the recognized characters to be the excerption target.

Moreover, in the case where the original document is a webpage, the excerpter 101 may exclude an image or characters to which a URL (Uniform Resource Locator) having a different domain as the webpage is linked, from the excerption target.

For example, character strings 624, 625 and 626 are included in images 621, 622 and 623 of the original document 600 respectively, and a URL having a different domain than the original document 600 is linked to image 623. The character size of the character string 624 is small, the character size of the character string 625 is very large, and the character size of the character string 626 is large. The excerpter 101 performs character recognition on the images 621 and 622 except the image 623 to which the URL having a different domain is linked, and obtains character strings 624 and 625. The excerpter 101 also removes character string 615 to which a URL having a different domain is linked from being an excerption target. The excerpter 101 then takes the character strings 601 to 614 and the recognized characters strings 624 and 625 to be the excerption target.

The excerpter 101 excerpts character strings 604, 605, 607, 611 to 614 and 625 having a relatively large character size from among the character strings 601 to 614, 624 and 625, and obtains an excerpted document. The calculator 102 then calculates the arrangement of the excerpted document, and the corrector 103 corrects the criterion as described above so that the excerpted document fits inside the area 800.

Here, when the arrangement does not fit the specified area, the excerpter 101 can also preferentially include a character string that appears plural times in the document in the excerpted document as long as the character size is the same.

For example, when the criterion of excerpting characters having a character size that is larger than the medium size (very large and large) is employed, the character strings 604, 605, 611, 612, 614 and 625 are excerpted. Then the corrector 103 determines that the excerpted document that includes these character strings does not fit in the area 800. In this case, both the character string 604 and the character string 612 have the same large character size, however, the character string 604 appears more than once in the document 600 (character string 614), so the excerpter 101 preferentially includes the character string 604 over the character string 612 in the excerpted document.

Figure 7:
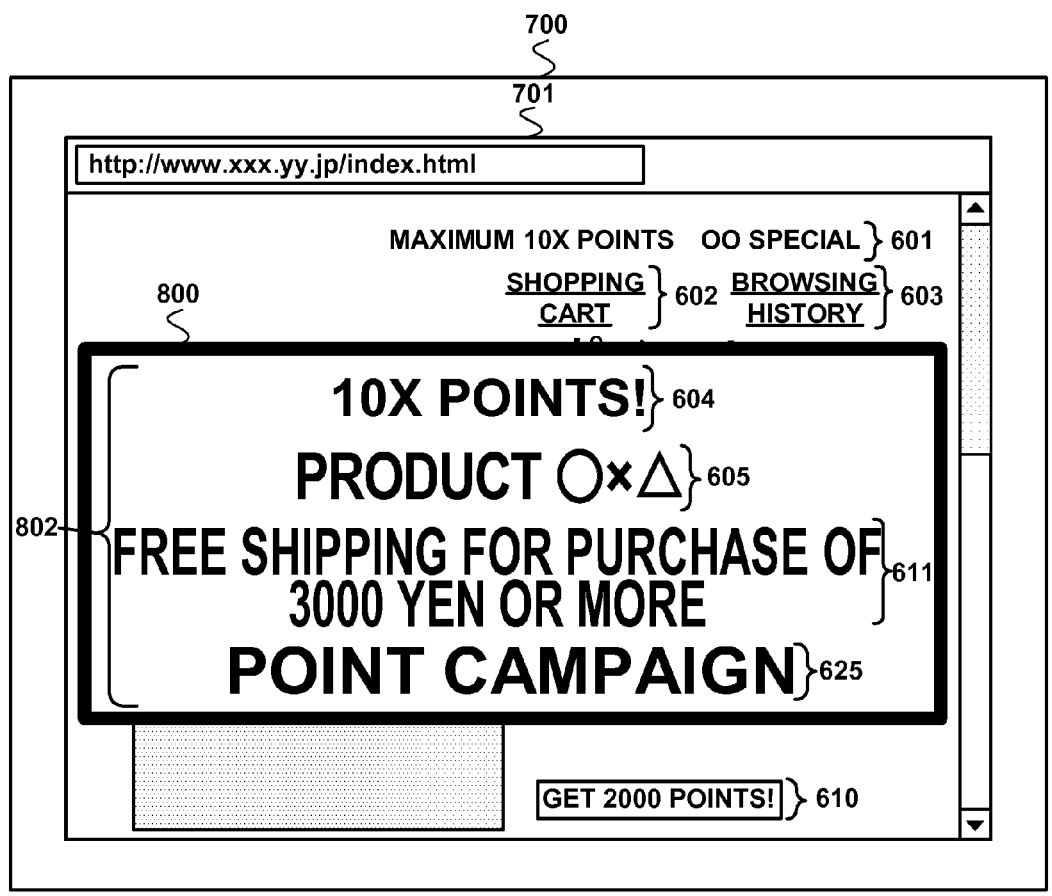
FIG. 7 is a drawing for explaining an excerpted document for which characters included in an image are the target of excerption.

Finally, the excerpter 101 obtains an excerpted document 802 that includes the character strings 604, 605, 611 and 625. As illustrated in FIG. 7, the obtained excerpted document 802 is displayed in area 800 on the screen 700.

In this way, by also taking character strings included in images to be the excerption target, it is possible to include characters that are included in images and thought to be important in the excerpted document.

Moreover, images or characters to which a URL having a different domain than the document that is displayed on the screen is linked are typically thought to be an advertisement or company logo, so it is possible to eliminate characters that are thought to be unimportant from the excerpted document.

In addition, it is possible to register phrases that have little relation to the content of the document or that are thought to be unnecessary for the excerpt, such as company logos or phrases that prompt orders, in a table beforehand, and to eliminate the phrases that are registered in this table from being a target of excerption.

When the original document is a webpage that introduces a product, the corrector 103 can acquire the genre of the product, and then based on the acquired genre, can correct the criterion so that characters recognized from an image are preferentially excerpted.

For example, the character size of the character string 624 that is included in the image 621 is small, so is not excerpted by the excerpter 101. However, when the original document 600 is a webpage that introduces a product, the importance of the characters that are included inside the image differs according to the genre of the product. For example, when the appearance of the product is important such as in the case of clothes, flowers and the like, characters that indicate important information may be included inside the image. However, when performance of the product is emphasized such as in the case of a computer and the like, performance information is often provided in portions other than images. Therefore, for example, in the case of a product for which the original document 600 emphasizes appearance, the corrector 103 corrects the criterion so that the character string 624 that is included in the image 621 is included in the excerpted document.

Figure 8:
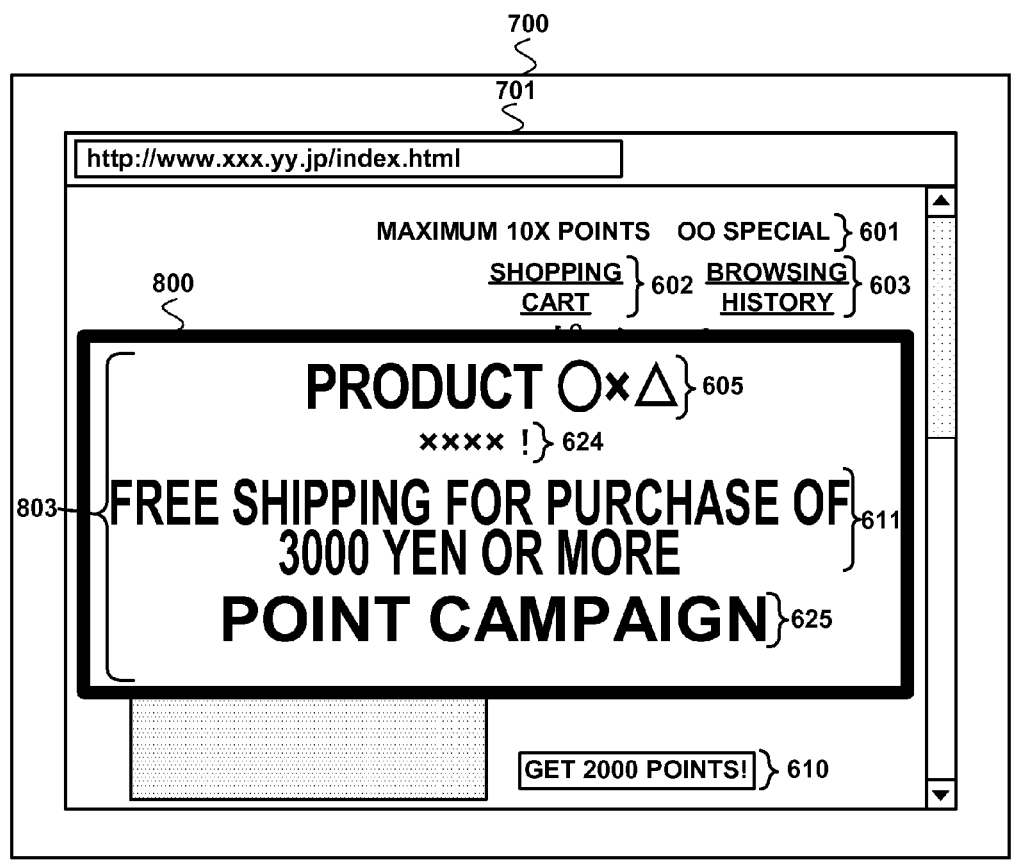
FIG. 8 is a drawing for explaining an excerpted document that was excerpted in consideration of the document genre.

The excerption device 101, based on the corrected criterion, obtains an excerpted document 803 that includes character string 624. Then, as illustrated in FIG. 8, the excerpted document 803 is displayed in the area 800 on the screen 700.

In this way, by adjusting the character strings to be excerpted according to the characteristics of the product, it is possible to include characters that are thought to be important in the excerpted document.

Moreover, the corrector 103 can correct the criterion based on whether or not decoration is performed on the characters that will be the target of excerption. Decoration, for example, is at least the setting of the foreground color, background color, framing or character style in the original document.

For example, the character string 609 is decorated with a background color, and character string 610 is decorated with a frame. Character strings 609 and 610 are character strings having a small character size; however, the corrector 103 corrects the criterion so that these decorated character strings are included in the excerpted document. The corrector 103, for example, corrects the criterion so that very large characters and decorated characters are excerpted.

Figure 9:
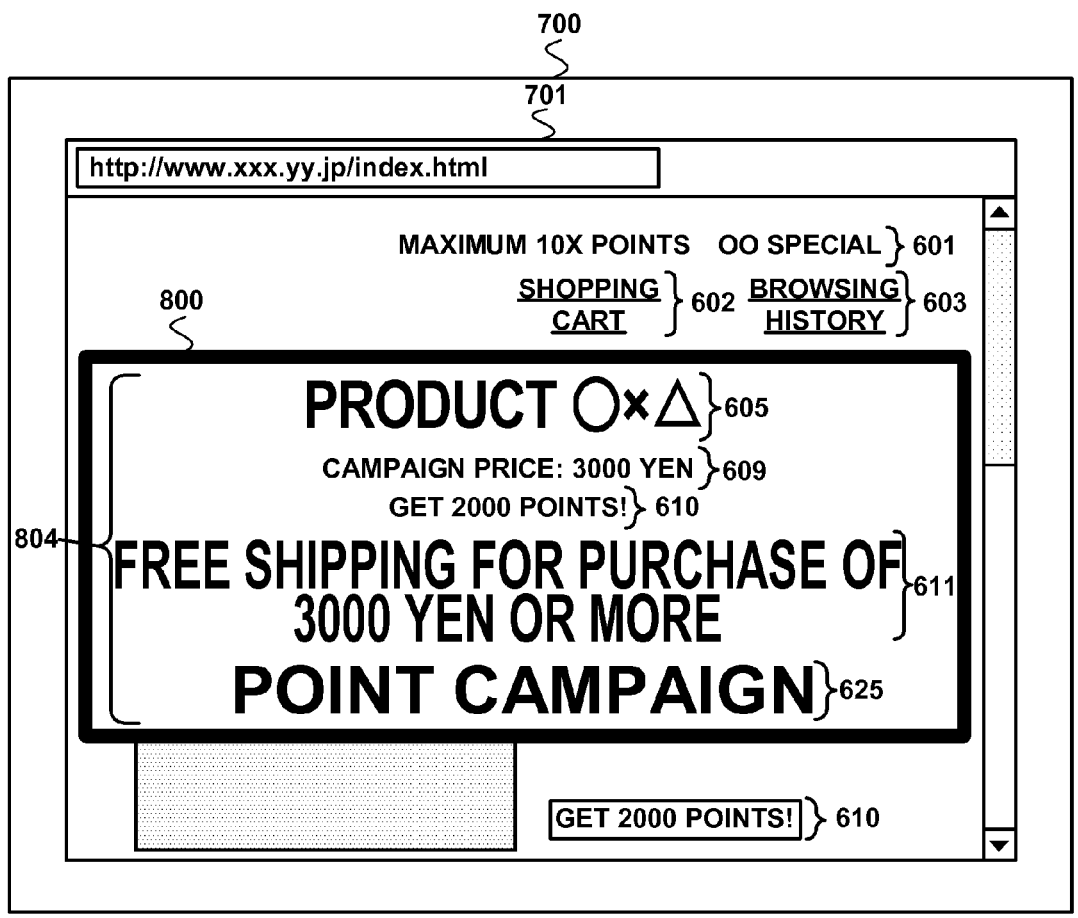
FIG. 9 is a drawing for explaining an excerpted document that was excerpted in consideration of the decoration of the characters.

The excerpter 101 obtains an excerption document 804 that includes character strings 605, 609, 610, 611 and 625 based on the corrected criterion. Then, as illustrated in FIG. 9, the excerpted document 804 is displayed in the area 800 on the screen 700.

With this kind of construction, it is possible to preferentially include characters that are thought to be important in the excerpted document.

In this embodiment, the excerpter 101 obtains an excerpted document by excerpting characters from an original document that are displayed on the screen with the character size maintained as is, however, it is also possible to obtain an excerpted document in which the character size is not maintained.

Figure 10:
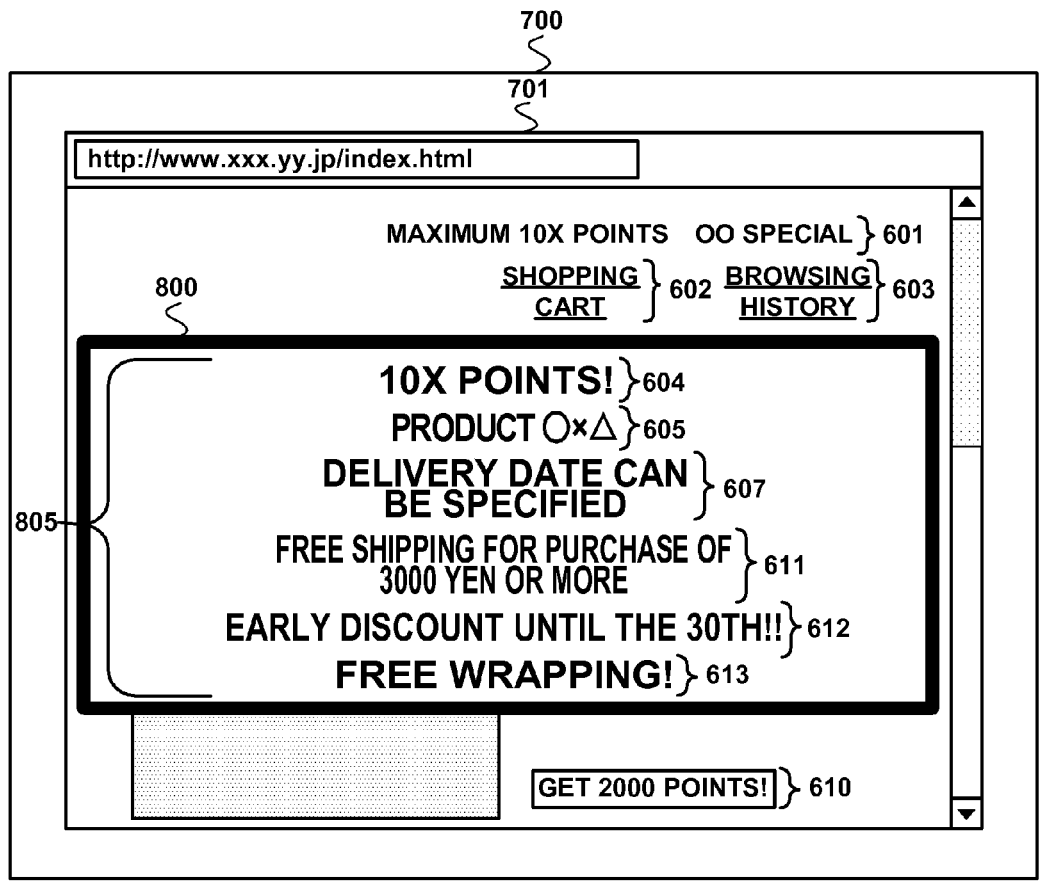
FIG. 10 is a drawing for explaining an excerpted document that was excerpted without maintaining the character size.

For example, based on the criterion of excerpting except the same character strings, character strings linked to a URL with a different domain and character strings inside images, the excerpter 101 excerpts characters having a relatively large size, and obtains an excerpted document 805 that includes the character strings 604, 605, 607, and 611 to 613. In this case, the calculator 102 calculates the arrangement (number of characters) so that the character strings that are included in the excerpted document have the same character size and fit inside the area 800. Then, as illustrated in FIG. 10, the excerpted document 805 is displayed on the screen 700.

With this kind of construction, it is possible to excerpt more characters from the original document 600 that are supposed to be displayed at a relatively large size. In other words, the user can check many characters that are emphasized in the document.

The timing at which an excerpted document that was obtained by the information processing device 100 is displayed on the screen is arbitrary. For example, the excerpted document can be displayed at the timing at which the original document 600 is first displayed by the browser 701. Alternatively, as illustrated in FIG. 11, an excerpt display button 632 is included in the document, and the excerpted document can be displayed by the user clicking on that button.

Figure 11:
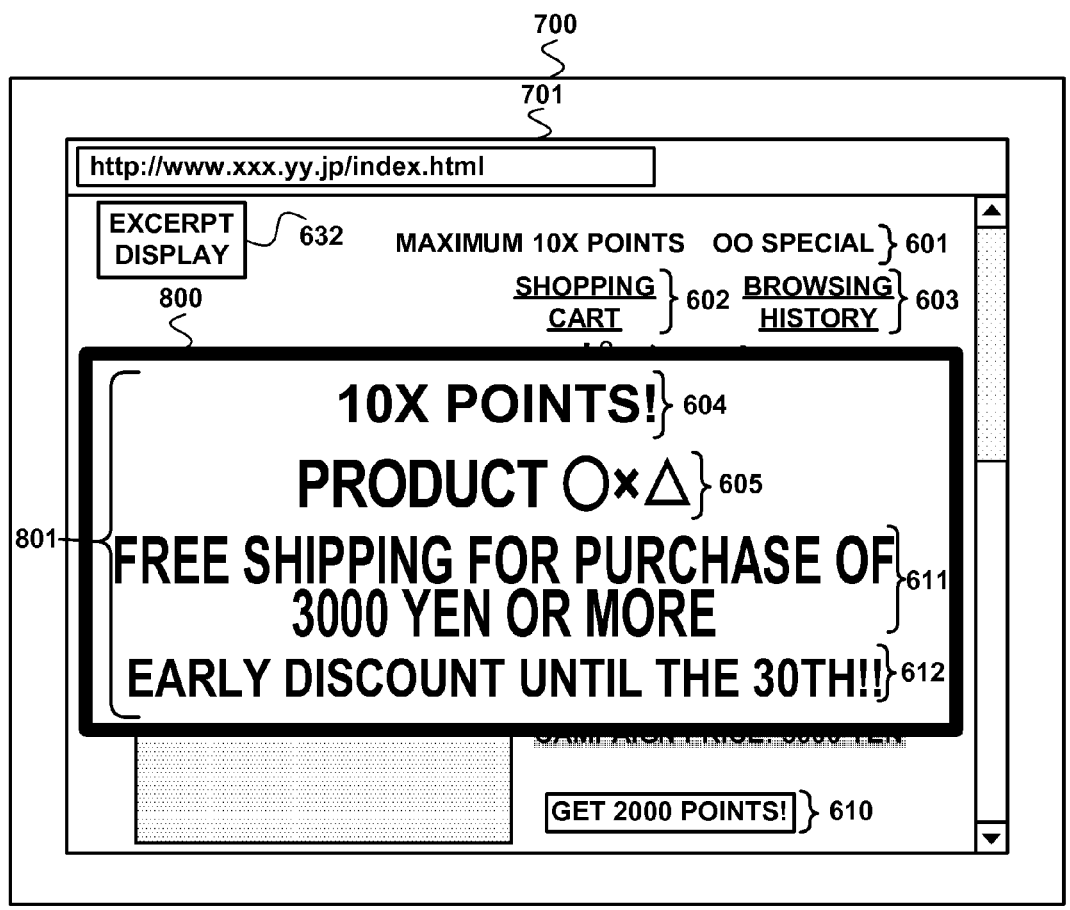
FIG. 11 is a drawing for explaining a document that includes an excerption display button.
Figure 12:
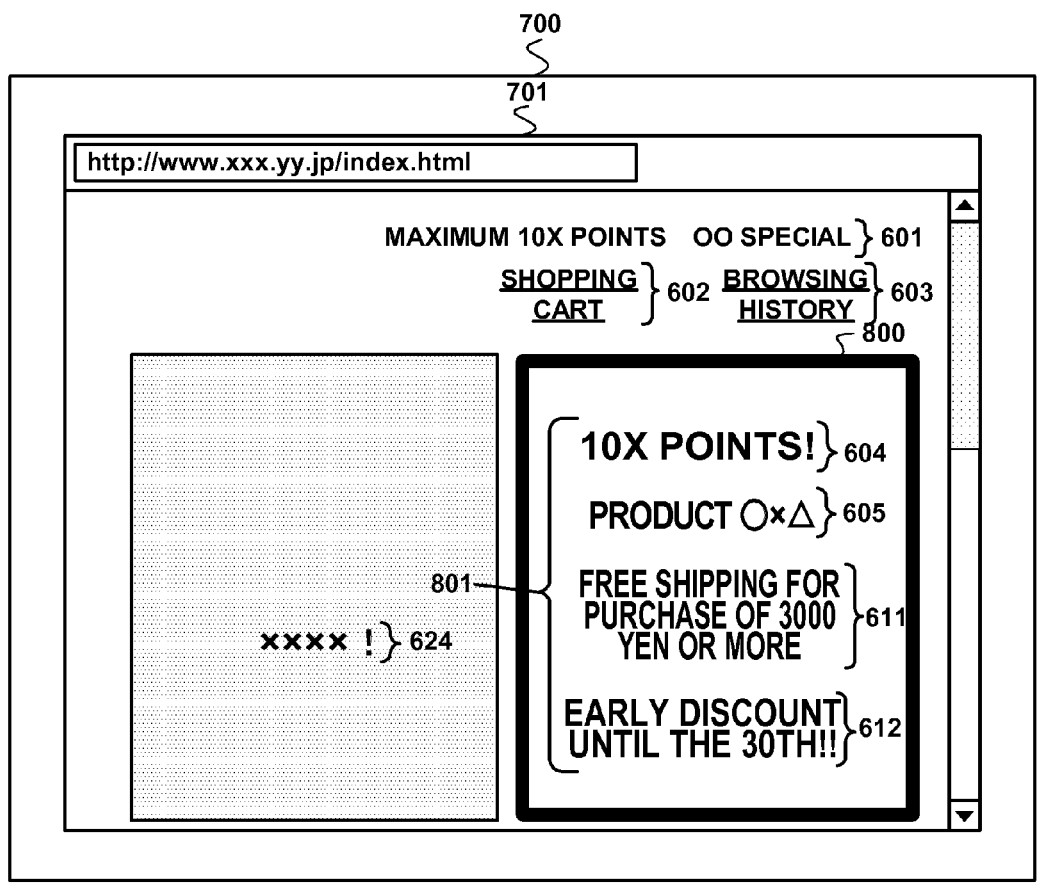
FIG. 12 is a drawing for explaining an example of a display having different specified areas.

Moreover, the display format of the specified area 800 is not limited to being displayed in the center of the browser as in FIG. 11. For example, as illustrated in FIG. 12, the specified area 800 can be displayed to one side of the browser, or can be displayed so as to avoid the image in the document.

(3. Operation of the Information Processing Device of the First Embodiment)

Figure 13:
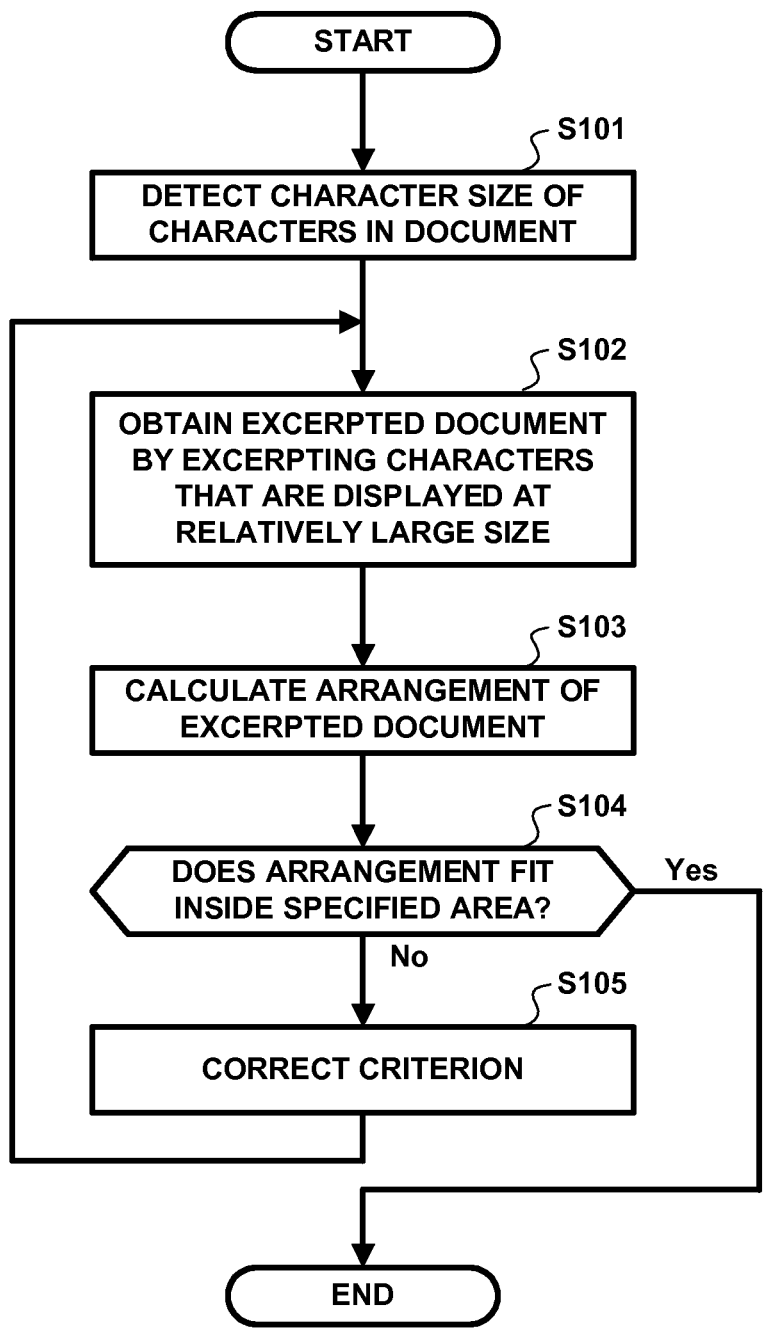
FIG. 13 is a flowchart for explaining the processing that is performed by each part of the information processing device of the first embodiment.

Next, the operation of the information processing device 100 of this embodiment will be explained. When an instruction is received from the user to display a document on the screen, or when the excerpt button 632 in FIG. 11 is clicked on, the CPU 501 starts the process that is illustrated in FIG. 13.

The excerpter 101, first detects the character size of the characters in the document (step S101). When doing this, the character size of characters that are not the target of excerption, and the character size of the characters included in images that are not the target of excerption are not detected.

For example, the excerpter 101 detects the character size of the character strings 601 to 614 in the original document 600. The excerpter 101 also performs character recognition on images 621 and 622 and acquires the character strings 624 and 625, then detects the character sizes of those character strings.

The excerpter 101 excerpts characters that are being displayed at a relatively large size, and obtains an excerpted document (step S102).

For example, the excerpter 101 excerpts the character strings 604, 605, 607, 611 to 614 and 625 from the original document 600, and obtains an excerpted document that includes the excerpted character strings.

The calculator 102 calculates the arrangement in which the excerpted document is to be displayed on the screen (step S103).

For example, the calculator 102 calculates how the excerpted document that includes the character strings 604, 605, 607, 611 to 614 and 625 is to be displayed on the screen.

The corrector 103 determines whether or not the arrangement calculated by the calculator 102 will fit inside the specified area (step S104).

When the corrector 103 determines that the arrangement will fit inside the specified area (step S104: YES), processing ends. On the other hand, when the corrector 103 determines that the arrangement will not fit inside the specified area (step S104: NO), the corrector 103 corrects the criterion for excerpting characters by the excerpter 101 (step S105). Processing then returns to step S102.

For example, when the corrector 103 determines that the excerpted document that includes the character strings 604, 605, 607, 611 to 614 and 625 do not fit inside the area 800, the corrector 103 corrects the criterion so that the number of character strings that are included in the excerpted document is reduced, and so that only character strings that have characters that are being displayed relatively larger and that have a larger character size are included in the excerpted document. For example, the corrector 103 corrects the criterion so that character strings having a size greater than a medium size are included in the excerpted document. Processing then returns to step S102, and the excerpter 101 excerpts character strings 604, 605, 611, 612, 614 and 625, and obtains an excerpted document. This excerpted document does not fit inside area 800 so the corrector 103 further corrects the criterion. For example, the corrector 103 corrects the criterion so that same character strings are eliminated and so that as long as the size is the same, character strings that appear plural times take priority.

Finally, the excerpter 101 obtains an excerption document 802 that includes character strings 604, 605, 611 and 625 based on the corrected criterion. The excerpted document 802 fits inside area 800, so that the process in FIG. 13 ends.

After the process in FIG. 13 ends, the obtained excerpted document is displayed on the screen. For example, as illustrated in FIG. 7, the excerpted document 802 is displayed inside the browser 701 on the screen 700.

(4. Functional Construction of an Information Processing Device of a Second Embodiment)

The information processing device 100 of a second embodiment excerpts characters from an original document having a size that is equal to or greater than a reference character size.

The information processing device 100 of this embodiment, as illustrated in FIG. 3, comprises an excerpter 101, a calculator 102, and a corrector 103. The calculator 102 of this embodiment has the same function as that of the first embodiment. In the following, the explanation will center on the functions of the excerpter 101 and the corrector 103 that differ from those of the first embodiment.

The excerpter 103 excerpts characters from the original document based on a reference character size that is the criterion for excerpting characters.

For example, the excerpter 103 obtains an excerpted document by excerpting characters from the original document 600 that have a character size that is equal to or larger than a reference character size. In this embodiment, characters inside images are also a target of excerption; however, images or characters to which a URL having a different domain is linked are eliminated from being a target.

The reference character size is a preset size, and can be arbitrarily changed by the user.

When the arrangement does not fit inside the specified area, the corrector 103 corrects the reference character size to a larger size, and when the arrangement fits inside the specified area, the corrector 103 corrects the reference character size to a smaller size so as to make the blank spaces in the specified area where the excerpted document is arranged small.

For example, when the reference character size is set to "medium", the excerpter 101 obtains an excerpted document by excerpting character strings 604, 605, 611 to 614 and 625 having a character size of medium or larger. In this case, when the corrector 103 determines that the arrangement of the excerpted document does not fit inside the specified area 800, the corrector 103 corrects the reference character size to a larger size, or in other words, "large". The excerpter 101 then obtains an excerpted document that includes characters strings having a character size of large or larger, after which, the calculator 102 calculates the arrangement again, and the corrector 103 determines whether or not the arrangement will fit inside the specified area. For example, the excerpter 101 excerpts character strings 604, 605, 611, 612, 614 and 625 having a character size of large or larger. Using a criterion in which a character string that appears plural times is excerpted only once, and of character strings having the same character size, a character string that appears plural times takes preference, the excerpter 101 obtains the excerpted document 802. The excerpted document 802 fits inside the area 800, so as illustrated in FIG. 7, the excerpted document 802 is displayed on the screen 700.

Figure 14:
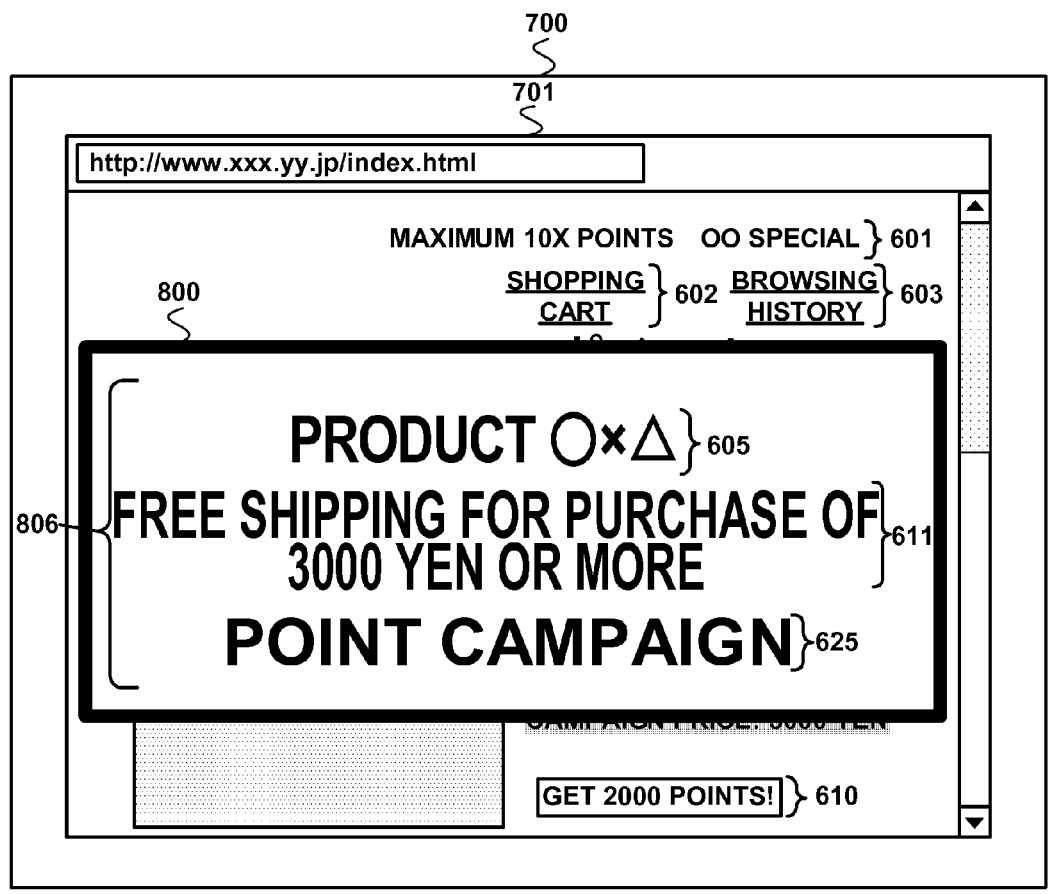
FIG. 14 is a drawing for explaining an excerption document having blank spaces.

On the other hand, when, for example, the reference character size is set to "very large", the excerpter 101 obtains an excerpted document 806 by excerpting character strings 605, 611 and 625 having a very large character size. As illustrated in FIG. 14, the excerpted document 806 fits inside the area 800, so that the corrector 103 corrects the reference character size to a smaller size, or in other words "large" so that the blank spaces in the area 800 will become smaller. The excerpter 101 then obtains an excerpted document that includes character strings having a character size of large or larger, after which processing is repeated by the calculator 102 and corrector 103.

With this embodiment, an excerpted document can be obtained based on an arbitrary reference character size. Moreover, an excerpted document having few blank spaces can be obtained, so it is possible to prevent omission of an excerpt of important information.

When the characters that are excerpted from the original document are displayed further toward the start of the original document than a specified element, the corrector 103 corrects the reference character size to a smaller size, and when the characters that are excerpted from the original document are displayed further toward the end of the original document than a specified element, the corrector 103 corrects the reference character size to a larger size.

The specified element is, for example, character string 602 of a "shopping cart" for temporarily listing products a user desires to purchase.

For example, when the current reference character size is "large", the corrector 103 corrects the reference character size for character strings that are displayed further toward the start than the character string 602 of a "shopping cart" to a smaller size, or in other words "small", and corrects the reference character size for character strings that are displayed further to the end than the character string 602 of a "shopping cart" to a larger size, or in other word, "very large".

Figure 15:
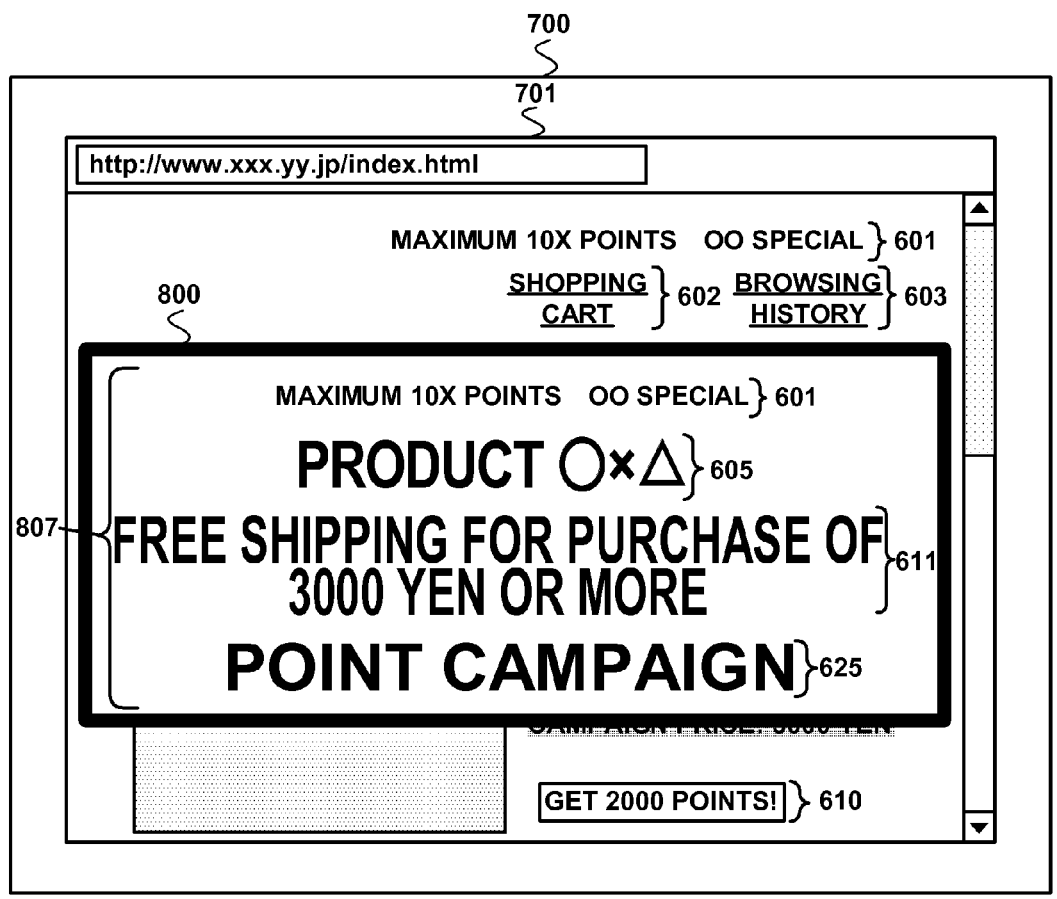
FIG. 15 is a drawing for explaining an excerption document that was excerpted in consideration of specified elements.

In the original document 600, the character string that is displayed further to the start than the character string 602 "shopping cart" is character string 601. Moreover, character strings that are displayed further to the end than the character string 602 "shopping cart" are character strings 604 to 614, 624 and 625. Therefore, the excerpter 101 obtains an excerpted document 807 that includes character strings 601, 605, 611 and 625. The excerpted document 807 fits inside the area 800, so that, as illustrated in FIG. 15, the excerpted document 807 is displayed on the screen 700.

Typically, the "shopping cart" is located at a position where a user is forced to make a purchase decision so often important information is displayed further toward the start of the document than the "shopping cart". By adjusting the reference character size with reference to the position of elements in this way, it is possible to include information that is thought to be important in the excerpted document without omission.

(5. Operation of the Information Processing Devices of the Second Embodiment)

Figure 16:
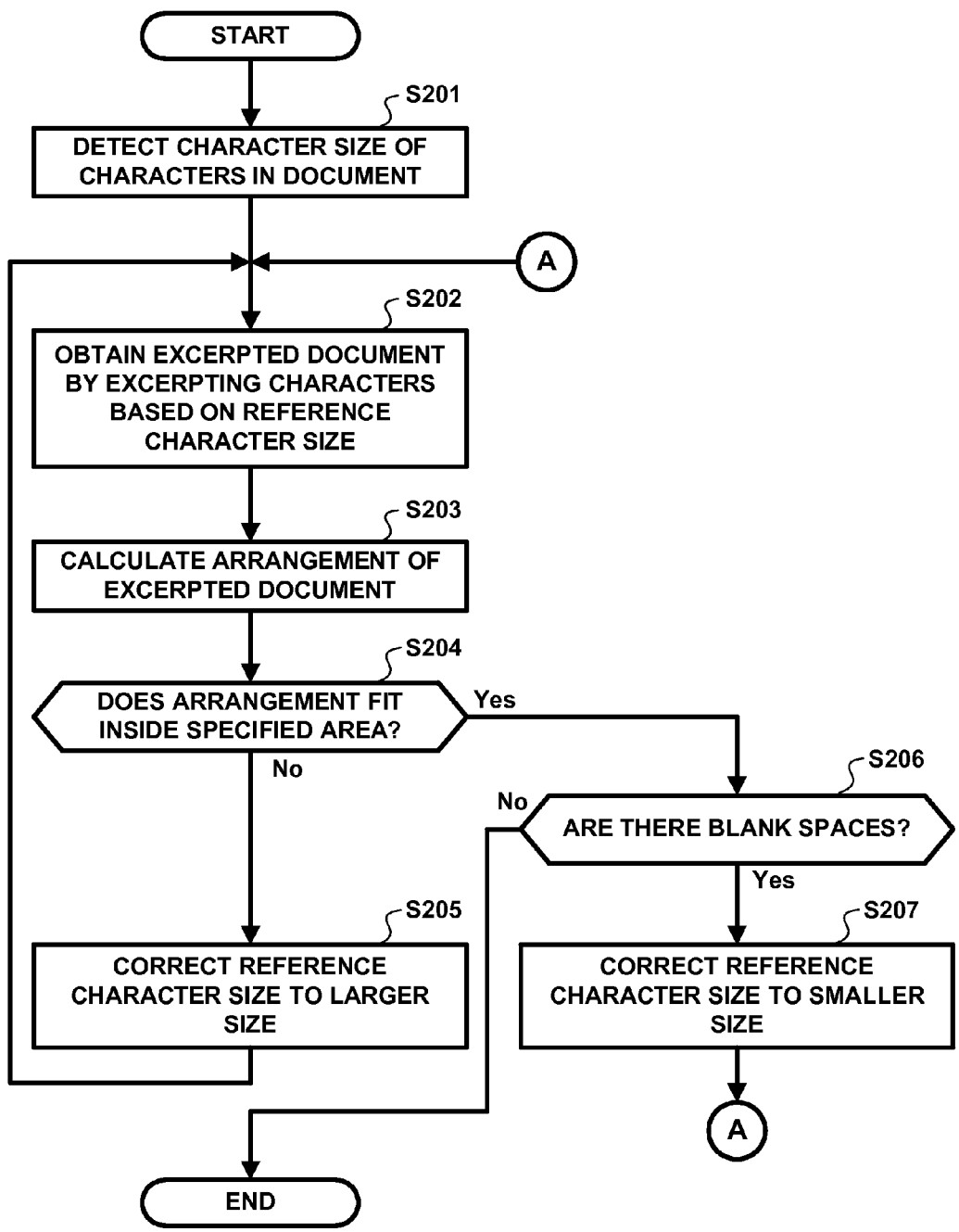
FIG. 16 is a flowchart for explaining the processing that is performed by each part of an information processing device of a second embodiment.

Next, the operation of the information processing device 100 of this embodiment will be explained. When an instruction is received from a user to display a document on the screen, or when the excerpt display button 632 in FIG. 11 is clicked on, the CPU 501 starts the process that is illustrated in FIG. 16. In the flowchart in FIG. 16, steps S201, S203 and S204 perform the same processing as steps S101, S103 and S104 in the flowchart in FIG. 13. Therefore, and explanation of these steps will be omitted.

The excerpter 101 obtains an excerpted document by excerpting characters based on the reference character size (step S202).

For example, when the reference character size is set to "medium", the excerpter 101 obtains an excerpted document by excerpting character strings 604, 605, 607, 611 to 614 and 625 having a character size that is medium or larger from the original document 600.

In step S204, when the corrector 103 determines that the excerpted document does not fit in the specified area (step S204: NO), the corrector 103 corrects the reference character size to a larger size (step S205). However, when the corrector 103 determines that the excerpted document will fit inside the specified area (step S204: YES), the corrector 103 determines whether or not there are blank spaces in the specified area in which character strings can be further inserted (step S206).

For example, when the excerpted document includes character strings 604, 605, 607, 611 to 614 and 625 having a character size that is medium or larger, the corrector 103 determines that the excerpted document will not fit inside the area 800, and corrects the reference character size from "medium" to "large". On the other hand, when the reference character size is set to "very large" and the excerpted document includes character strings 605, 611 and 625 having a character size that is very large or larger, the corrector 103 determines that the excerpted document will fit inside the area 800. Then, the corrector 103 determines whether or not there are blank spaces in the area 800.

In step S206, when the corrector 103 determines that there are blank spaces (step S206: YES), the corrector 103 corrects the reference character size to a smaller size (step S207). Processing then returns to step S202. On the other hand, when the corrector 103 determines that there are no blank spaces (step S206: NO), the process in FIG. 16 ends.

For example, as illustrated in FIG. 14, when there are blank spaces in the area 800 in which a character string can be inserted, the corrector 103 corrects the reference character size from "very large" to "large".

Moreover, the corrector 103 further corrects the reference character size to "small" for characters of character strings that are displayed further toward the start than a specified element.

Processing then returns to step S202, and the excerpter 101 obtains a new excerpted document based on the new reference character size. Processing from step S203 is then repeated.

In step S206, when it is determined that there are no blank spaces in which a character string could be inserted, the process in FIG. 16 ends, and the obtained excerpted document is displayed on the screen. For example, as illustrated in FIG. 15, the excerpted document 807 is displayed on the screen 700.

The invention of the first and second embodiments is such that in either case it is possible to check the excerpted contents without having to perform a screen operation such as scrolling. Therefore, the invention is effective for long documents that cannot be completely displayed on the screen at the same time.

In the first and second embodiments, the original document was explained as being displayed on the screen; however, the original document is not limited to this. For example, the original document can be a linked page.

Figure 17:
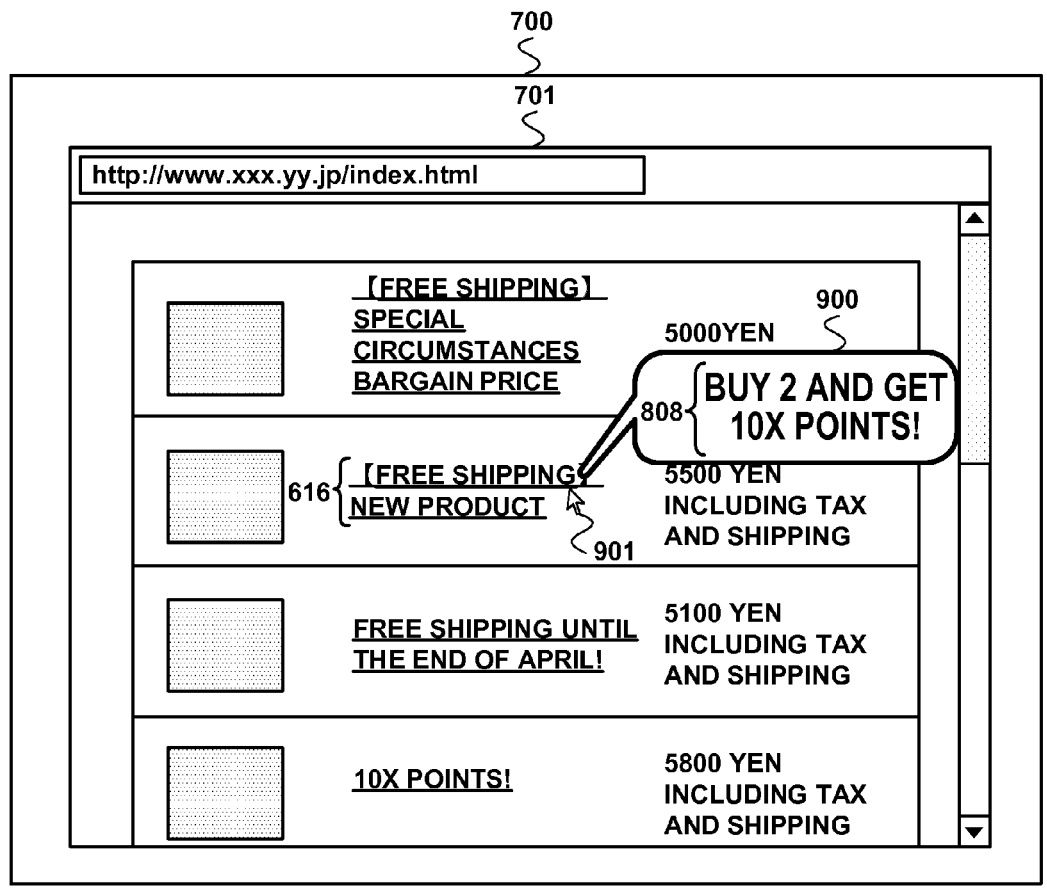
FIG. 17 is a drawing for explaining an excerption document for which a linked page is the excerption target.

For example, as illustrated in FIG. 17, on a page that displays product information of plural products, when the cursor 901 is placed near a character string 616 to which another page is linked, the excerpter 101 obtains an excerpted document 808 by excerpting characters from the linked page that are displayed at a relatively large size on the linked page. Then, the excerpted document 808 is fitted inside a specified area 900 and displayed on the screen 700.

With this kind of construction, the user is able to check important information that is not displayed on the screen without transition the display on the screen.

In this case, the excerpter 101 does not have to take characters that are displayed in a snippet to be an excerption target. As a result, when there is redundancy between characters that are currently displayed on the screen and characters that are displayed on a linked page, it is possible to not include those redundant characters in the excerpted document. Therefore, it is possible to provide the user with only useful information without providing redundant information.

The present invention is based on Japanese Patent Application No. 2012-104214 that was filed on Apr. 27, 2012. The entire disclosure including the description, claims and drawings of Japanese Patent Application No. 2012-104214 are incorporated in this specification by reference.

REFERENCE SIGNS LIST 100, 500 Information processing device
101 Excerpter
102 Calculator
103 Corrector
200, 201, 202 to 20n Terminal
300 Server
400 Internet
501 CPU
502 ROM
503 RAM
504 NIC
505 Image processor
506 Audio processor
507 DVD-ROM drive
508 Interface
509 External memory
510 Controller
511 Monitor
512 Speaker
600 Original document
601 to 616, 624 to 626 Character string
621 to 623 Image
631 Button
632 Excerpt display button
700 Screen
701 Browser
800, 900 Area
801 to 808 Excerpted document
901 Cursor

The invention claimed is:

1. An information processing device, comprising:
at least one memory operable to store program code;
at least one processor operable to access said memory and read said program code and operate as instructed by said program code, said program code including:
displaying code configured to cause at least one of said at least one processor to display a cursor and a link source document on a screen, the link source document including a snippet of an original document as a link to the original document;
excerpting code configured to cause at least one of said at least one processor to obtain an excerpted document by excerpting, the original document, only at least one character string which is different from the snippet being displayed on the screen, the at least one character string configured to be displayed on the screen in a larger size compared to other character strings, the excerpted document consisting only of the at least one character string; and
correcting code configured to cause, when an amount of the excerpted document that is to be displayed on the screen does not fit inside a specified amount, at least one of said at least one processor to correct a character-size criterion for excerpting the at least one character string from the original document; wherein
the excerpting code is further configured to cause at least one of said at least one processor to obtain the excerpted document based on the corrected criterion, and as the cursor approaches the snippet, the displaying code is further configured to cause at least one of said at least one processor to display the obtained excerpted document on the screen on which the snippet is being displayed.

2. The information processing device according to claim 1, wherein
the excerpting code is further configured to cause at least one of said at least one processor to excerpt the character string from the original document based on a reference character size that is the criterion for excerpting the character string; and
the correcting code is further configured to cause at least one of said at least one processor to correct the reference character size to a larger size when the amount does not fit inside the specified amount, and to correct the reference character size to a smaller size when the amount fits into the specified amount so that blank spaces in the specified amount where the excerpted document is arranged become small.

3. The information processing device according to claim 2, wherein
the correcting code is further configured to cause at least one of said at least one processor to correct the reference character size to a smaller size when the character string excerpted from the original document is displayed further toward the start of the original document than a specified element, and to correct the reference character size to a larger size when the character string excerpted from the original document is displayed further toward the end of the original document than the specified element.

4. The information processing device according to claim 1, wherein
the correcting code is further configured to cause at least one of said at least one processor to acquire the size of a display area where the original document is displayed on the screen, and to find the size of the specified amount from the acquired size.

5. The information processing device according to claim 1, further comprising
a calculating code configured to cause at least one of said at least one processor to calculate the amount.

6. The information processing device according to claim 5, wherein
the excerpting code is further configured to cause at least one of said at least one processor to obtain the excerpted document by excerpting the character string while maintaining the character size of the original document that is displayed on the screen.

7. The information processing device according to claim 5, wherein
the correcting code is further configured to cause at least one of said at least one processor to correct the criterion based on whether or not decorating is performed on a character string that is the target of excerption.

8. The information processing device according to claim 7, wherein
the decorating is at least a setting of foreground color, background color, framing, or character style in the original document.

9. The information processing device according to claim 1, wherein
the original document is a webpage; and
the excerpting code is further configured to cause at least one of said at least one processor to exclude an image or a character string to which a URL having a domain that is different than the webpage is linked, from a target of excerption.

10. The information processing device according to claim 1, wherein
the excerpting code is further configured to cause at least one of said at least one processor to perform character recognition of character string and character size from images that are included in the original document, and to take the recognized character string to be the target of excerption.

11. The information processing device according to claim 10, wherein
the original document is a webpage that introduces products; and
the correcting code is further configured to cause at least one of said at least one processor to acquire the genre of the products, and based on the acquired genre, to correct the criterion so that the recognized character string is preferentially excerpted.

12. The information processing device according to claim 1, wherein
the excerpting code is further configured to cause at least one of said at least one processor to excerpt the least one character string, the at least one character string being different from the snippet, from among character strings in the original document that are separated from each other by a new line or a tag, wherein the at least one character string is to be displayed on the screen in a larger size compared to the other character strings of the original document, when the original document is to be displayed on the screen.

13. The information processing device according to claim 1, wherein
the link source document includes a plurality of snippets, each of the plurality of snippets being a snippet of an original document as a link to the original document,
as the cursor approaches any of the plurality of snippets, the displaying code is further configured to cause at least one of said at least one processor to display excerpted document that is obtained from the original document linked to the snippet which the cursor is approaching, on the screen, and
when any of the plurality of snippets is selected by a user, the display on the screen transitions to the original document that is linked to the selected snippet.

14. A processing method, performed by an information processing device, including at least one processor, the method comprising:
displaying, using at least one of said at least one processor, a cursor and a link source document on a screen, the link source document including a snippet of an original document as a link to the original document;
obtaining, using at least one of said at least one processor, an excerpted document by excerpting, from the original document, only at least one character string which is different from the snippet being displayed on the screen, the at least one character string configured to be displayed on the screen in a larger size compared to other character strings, the excerpted document consisting only of the at least one character string; and
correcting, when an amount of the excerpted document that is to be displayed on the screen does not fit inside a specified amount, using at least one of said at least one processor, a character-size criterion for excerpting the at least one character string from the original document; wherein
the excerpted document is obtained based on the corrected criterion, and
as the cursor approaches the snippet, the displaying further comprises displaying the obtained excerpted document on the screen on which the snippet is being displayed.

15. A non-transitory recording medium that is readable by a computer and on which a program is recorded that causes a computer, including at least one processor, to:
display, using at least one of said at least one processor, a cursor and a link source document on a screen, the link source document including a snippet of an original document as a link to the original document;
obtain, using at least one of said at least one processor, an excerpted document by excerpting, from the original document, only at least one character string which is different from the snippet being displayed on the screen, the at least one character string configured to be displayed on the screen in a larger size compared to other character strings, the excerpted document consisting only of the at least one character string; and
correct, when an amount of the excerpted document that is to be displayed on the screen does not fit inside a specified amount, using at least one of said at least one processor, a character-size criterion for excerpting the at least one character string from the original document; wherein
the excerpted document is obtained based on the corrected criterion, and
as the cursor approaches the snippet, the program further causes the computer to display the obtained excerpted document on the screen on which the snippet is being displayed.

* * * * *